US012580174B2

(12) United States Patent
Matsuoka et al.

(10) Patent No.: US 12,580,174 B2
(45) Date of Patent: Mar. 17, 2026

(54) POSITIVE ELECTRODE FOR NON-AQUEOUS ELECTROLYTE SECONDARY BATTERIES, AND NON-AQUEOUS ELECTROLYTE SECONDARY BATTERY

(71) Applicant: Panasonic Intellectual Property Management Co., Ltd., Osaka (JP)

(72) Inventors: Rie Matsuoka, Osaka (JP); Youichirou Uka, Hyogo (JP); Yuta Kuroda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 930 days.

(21) Appl. No.: 16/975,872

(22) PCT Filed: Feb. 4, 2019

(86) PCT No.: PCT/JP2019/003829
§ 371 (c)(1),
(2) Date: Aug. 26, 2020

(87) PCT Pub. No.: WO2019/167558
PCT Pub. Date: Sep. 6, 2019

(65) Prior Publication Data
US 2020/0411842 A1 Dec. 31, 2020

(30) Foreign Application Priority Data
Feb. 27, 2018 (JP) ................................. 2018-033246

(51) Int. Cl.
*H01M 4/131* (2010.01)
*H01M 4/505* (2010.01)
(Continued)

(52) U.S. Cl.
CPC ........... *H01M 4/131* (2013.01); *H01M 4/505* (2013.01); *H01M 4/525* (2013.01); *H01M 4/622* (2013.01);
(Continued)

(58) Field of Classification Search
CPC ...... H01M 4/131; H01M 4/505; H01M 4/525; H01M 4/622; H01M 10/0525;
(Continued)

(56) References Cited

U.S. PATENT DOCUMENTS

2009/0226811 A1 9/2009 Nakaoka
2016/0240854 A1 8/2016 Sakurai et al.
(Continued)

FOREIGN PATENT DOCUMENTS

CN 104103826 B * 1/2019 ............. C01D 15/02
EP 3376573 A1 9/2018
(Continued)

OTHER PUBLICATIONS

The Extended (Supplementary) European Search Report dated Mar. 19, 2021, issued in counterpart EP Application No. 19760403.6. (7 pages).
(Continued)

*Primary Examiner* — Kaity V Chandler
(74) *Attorney, Agent, or Firm* — WHDA, LLP

(57) ABSTRACT

A positive electrode for non-aqueous electrolyte secondary batteries has a mix layer which contains composite oxide particles each containing Ni, Co and Li and also contains Mn and/or Al, a conductive material, and poly(vinyl alcohol) having a saponification degree of 85% or less. In the composite oxide particles, the content of Ni relative to the total number of moles of metal elements other than Li is 50 mol % or more, and the ratio of the BET specific surface area A ($m^2$/g) to the theoretical specific surface area B ($m^2$/g) as
(Continued)

determined in accordance with the below-mentioned formula, i.e., (A/B), is 1.0 to 4.3 exclusive. The theoretical specific surface area B ($m^2$/g)=6/((true density (g/$cm^3$))× (volume average particle diameter (μm))).

7 Claims, 1 Drawing Sheet

(51) Int. Cl.

| | |
|---|---|
| *H01M 4/525* | (2010.01) |
| *H01M 4/62* | (2006.01) |
| *H01M 10/0525* | (2010.01) |
| *H01M 4/02* | (2006.01) |

(52) U.S. Cl.
CPC .. H01M 10/0525 (2013.01); *H01M 2004/021* (2013.01); *H01M 2004/028* (2013.01)

(58) Field of Classification Search
CPC ..... H01M 2004/021; H01M 2004/028; H01M 4/62; H01M 4/623; Y02E 60/10

See application file for complete search history.

(56) References Cited

U.S. PATENT DOCUMENTS

| | | | |
|---|---|---|---|
| 2017/0077509 A1* | 3/2017 | Ise | ..................... H01M 10/056 |
| 2018/0358624 A1 | 12/2018 | Narutomi et al. | |

FOREIGN PATENT DOCUMENTS

| | | | | |
|---|---|---|---|---|
| JP | 10-125325 | * | 5/1998 | ............. Y02E 60/10 |
| JP | H10-125325 A | | 5/1998 | |
| JP | H10-188982 A | | 7/1998 | |
| JP | 2009-205893 A | | 9/2009 | |
| JP | 2015-195167 A | | 11/2015 | |
| JP | 2017-54650 A | | 3/2017 | |
| JP | 6375050 B1 | * | 8/2018 | ............. Y02E 60/10 |
| KR | 20170055923 A | * | 5/2017 | ........ H01M 10/0525 |
| WO | 2011/083648 A1 | | 7/2011 | |
| WO | 2017/104178 A1 | | 6/2017 | |
| WO | 2019/026630 A1 | | 2/2019 | |

OTHER PUBLICATIONS

International Search Report dated Apr. 23, 2019, issued in counterpart application No. PCT/JP2019/003829, with English translation. (3 pages).

English Translation of Chinese Search Report dated Sep. 30, 2022, issued in counterpart CN application No. 201980010361.5. (3 pages).

* cited by examiner

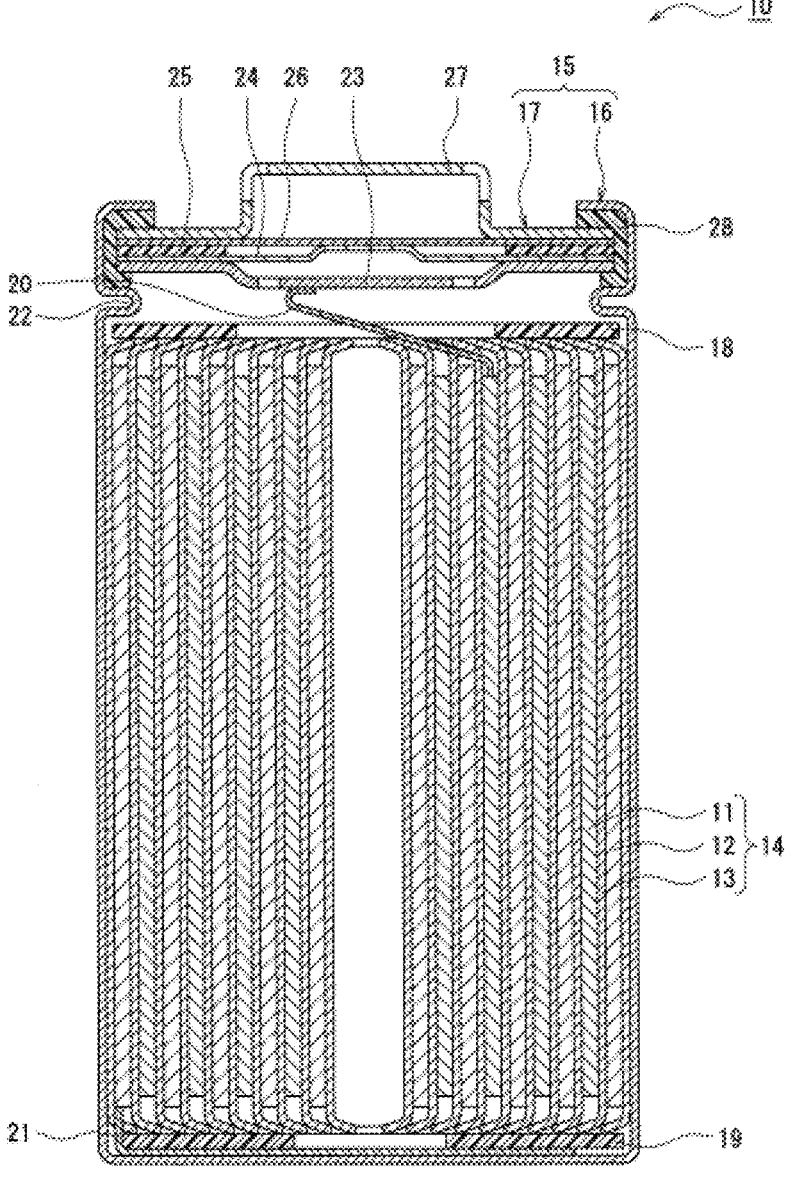

POSITIVE ELECTRODE FOR NON-AQUEOUS ELECTROLYTE SECONDARY BATTERIES, AND NON-AQUEOUS ELECTROLYTE SECONDARY BATTERY

TECHNICAL FIELD

The present disclosure relates to a positive electrode for a non-aqueous electrolyte secondary battery, and a non-aqueous electrolyte secondary battery.

BACKGROUND ART

Non-aqueous electrolyte secondary batteries in which a composite oxide containing Ni, Co, and Li is used as the positive electrode active material have been widely known traditionally (e.g., see Patent Literature 1). Further, in order to obtain a larger capacity of the battery, in the composite oxide containing Ni, Co, and Li, it is suggested to set the proportion of Ni to 50 mol % or more based on the total number of moles of the metal elements expect for Li. In Patent Literature 2, in order to improve the battery performance such as cyclic characteristics and loading characteristics, setting the ratio of the BET specific surface area to the theoretical specific surface area of the composite oxide to 5 to 50 has been disclosed.

CITATION LIST

Patent Literature

PATENT LITERATURE 1: Japanese Unexamined Patent
 Application Publication No. Hei 10-188982
PATENT LITERATURE 2: Japanese Unexamined Patent
 Application Publication No. 2009-205893

SUMMARY

Incidentally, in a non-aqueous electrolyte secondary battery, achieving a high initial discharge capacity and good cyclic characteristics is an important issue. Patent Literature 2 mentions that the battery performance such as cyclic characteristics and loading characteristics is improved, but the technique of Patent Literature 2 is still required to be improved particularly with respect to the initial charge capacity and cyclic characteristics. It is difficult for conventional techniques including the techniques of Patent Literatures 1 and 2 to simultaneously achieve a high initial discharge capacity and good cyclic characteristics.

A positive electrode for a non-aqueous electrolyte secondary battery as one aspect of the present disclosure is a positive electrode for a non-aqueous electrolyte secondary battery, including a current collector and a mixture layer provided on the current collector, wherein the mixture layer includes composite oxide particles containing Ni, Co, and Li and containing at least one of Mn and Al, a conductive agent, and polyvinyl alcohol having a degree of saponification of 85% or less, the composite oxide particles have a proportion of Ni of 50 mol % or more based on the total number of moles of the metal elements expect for Li, and the ratio of a BET specific surface area A $(m^2/g)$ to a theoretical specific surface area B $(m^2/g)$ (A/B) to be determined by the following expression is more than 1.0 and less than 4.3:

$$\text{Theoretical specific surface area } B \ (m^2/g) = 6/(\text{True density } (g/cm^3) \times \text{volume average particle size } (\mu m)).$$

A non-aqueous electrolyte secondary battery as an aspect of the present disclosure is characterized by comprising the positive electrode described above, a negative electrode, and a non-aqueous electrolyte.

According to one aspect of the present disclosure, it is possible to provide a non-aqueous electrolyte secondary battery having a high initial discharge capacity and excellent cyclic characteristics.

BRIEF DESCRIPTION OF DRAWING

FIG. 1 is a sectional view of a non-aqueous electrolyte secondary battery, which is one example of an embodiment.

DESCRIPTION OF EMBODIMENTS

As mentioned above, in a non-aqueous electrolyte secondary battery, simultaneously achieving a high initial discharge capacity and good cyclic characteristics is an important issue. In order to obtain a larger capacity of the battery, a lithium metal composite oxide having a proportion of Ni of 50 mol % or more based on the total number of moles of the metal elements expect for Li is desirably used as the positive electrode active material. The present inventors have found that the cyclic characteristics of the battery are improved by use of a positive electrode active material having small surface projections and recesses, wherein the ratio of the BET specific surface area A $(m^2/g)$ to the theoretical specific surface area B $(m^2/g)$ of the composite oxide (A/B) is controlled to more than 1.0 and less than 4.3.

Meanwhile, in the case where the above-described positive electrode active material having A/B of more than 1.0 and less than 4.3 is used, an issue is revealed in that a sufficient initial discharge capacity cannot be obtained. The present inventors have intensively studied to address such a problem and found that addition of polyvinyl alcohol (PVA) to the positive electrode mixture layer has markedly enhanced the initial discharge capacity, thus conceiving the configuration of a positive electrode according to the present disclosure. This is mainly because use of polyvinyl alcohol enhances the adhesion between the positive electrode active material and the conductive agent to thereby enhance the electron conductivity in the positive electrode mixture layer. According to the positive electrode in accordance with the present disclosure, in the positive electrode active material described above having good cyclic characteristics, it is possible to obtain a high initial discharge capacity.

The BET specific surface area A of the composite oxide particles herein is measured in accordance with the BET method (nitrogen adsorption method) described in JIS R1626. Specifically, the BET nitrogen adsorption isotherm of dried composite oxide particles is measured using an automatic specific surface area/pore distribution analyzer (Autosorb iQ3-MP manufactured by Quantachrome Instruments), and the specific surface area is calculated from the amount of nitrogen adsorbed using a BET multipoint method. The nitrogen adsorption isotherm measurement is conducted using nitrogen as the adsorbate under a condition of an adsorbate cross-sectional area of 0.162 $nm^2$ by use of a constant volume method.

The true density of the composite oxide particles, which is used in calculating the theoretical specific surface area B of the composite oxide particles, is measured using a dry-process automatic pycnometer (AccuPyc II 1340 manufactured by SHIMADZU CORPORATION). The true density is the average value of three measurements obtained using this apparatus.

The volume average particle size of the composite oxide particles, which is used in calculating the theoretical specific surface area B of the composite oxide particles, is measured using a laser diffraction-scattering particle size distribution analyzer (MT3000II manufactured by MicrotracBEL Corp.). The volume average particle size means a median diameter at which the cumulative volume value is 50% in the particle diameter distribution obtained using this apparatus.

Hereinafter, one example of the embodiment will be described in detail. Hereinafter, a cylindrical battery in which an electrode assembly having a wound structure 14 is housed in a cylindrical battery case is exemplified. The electrode assembly may be not limited to the wound type and may be a laminated type formed by alternately laminating a plurality of positive electrodes and a plurality of negative electrodes with separators therebetween. The non-aqueous electrolyte secondary battery according to the present disclosure also may be a rectangular battery comprising a rectangular metal case, a coin-shaped battery comprising a coin-shaped metal case, or the like and also may be a laminate battery comprising an exterior body composed of a laminate sheet including a metal layer and a resin layer. A description of a numerical value (A) to a numerical value (B) herein, unless otherwise indicated, means a numerical value (A) or more and a numerical value (B) or less.

FIG. 1 is a sectional view of a non-aqueous electrolyte secondary battery 10, which is one example of the embodiment. As exemplified in FIG. 1, the non-aqueous electrolyte secondary battery 10 comprises an electrode assembly 14, a non-aqueous electrolyte (not shown), and a battery case 15 that houses the electrode assembly 14 and non-aqueous electrolyte. The electrode assembly 14 has a wound structure that comprises a positive electrode 11, a negative electrode 12, and a separator 13 and in which the positive electrode 11 and the negative electrode 12 are wound together with the separator 13 therebetween. The battery case 15 is composed of a bottomed cylindrical exterior can 16 and a sealing assembly 17 blocking the opening of the exterior can 16.

The non-aqueous electrolyte secondary battery 10 comprises insulating plates 18 and 19 each disposed above and under the electrode assembly 14. In the example shown in FIG. 1, a positive electrode lead 20 attached to the positive electrode 11 extends through a through-hole in the insulating plate 18 to the side of the sealing assembly 17, and a negative electrode lead 21 attached to the negative electrode 12 extends outside the insulating plate 19 to the side of the bottom of the exterior can 16. The positive electrode lead 20 is connected to the lower surface of the filter 23, which is the bottom plate of the sealing assembly 17, by means of welding or the like. A cap 27, which is the top plate of the sealing assembly 17 electrically connected to the filter 23, serves as the positive electrode terminal. The negative electrode lead 21 is connected to the inner surface of the bottom of the exterior can 16 by means of welding or the like, and the exterior can 16 serves as the negative electrode terminal.

The exterior can 16 is, for example, a bottomed cylindrical metal container. A gasket 28 is provided between the exterior can 16 and the sealing assembly 17 to achieve hermeticity inside the battery. In the exterior can 16, a projecting portion 22, of which side wall partially projects inside, is formed for supporting the sealing assembly 17. The projecting portion 22 is preferably annularly formed along the peripheral direction of the exterior can 16, supporting the sealing assembly 17 by the upper surface thereof.

The sealing assembly 17 has a structure in which the filter 23, a lower vent member 24, an insulating member 25, an upper vent member 26, and the cap 27 are layered, in the order presented, from the side of the electrode assembly 14. The members composing the sealing assembly 17 each have a disk shape or a ring shape, for example, and the members except for the insulating member 25 are each electrically connected to one another. The lower vent member 24 and the upper vent member 26 are connected at each center part to each other, and the insulating member 25 is interposed between the peripheral edges of the vent members. When the internal pressure of the battery rises due to abnormal heat generation, the lower vent member 24 deforms and breaks so as to push up the upper vent member 26 toward the side of the cap 27, and the current path between the lower vent member 24 and the upper vent member 26 is disconnected. When the internal pressure further rises, the upper vent member 26 breaks, and gas is emitted from the opening of the cap 27.

[Positive Electrode]

The positive electrode 11 has a positive electrode current collector and a positive electrode mixture layer provided on the current collector. Foil of a metal that is stable in the electric potential range of the positive electrode 11, such as aluminum, a film with such a metal disposed as an outer layer, and the like can be used for the positive electrode current collector. The positive electrode mixture layer includes composite oxide particles containing Ni, Co, and Li and containing at least one of Mn and Al, a conductive agent, and polyvinyl alcohol (PVA). The positive electrode mixture layer is preferably provided on both the surfaces of the positive electrode current collector. The positive electrode 11 can be produced by, for example, coating a positive electrode mixture slurry on a positive electrode current collector, drying the coating, and then compressing the dried coating to form a positive electrode mixture layer on both the surfaces of the positive electrode current collector.

The composite oxide particles included in the positive electrode mixture layer function as a positive electrode active material and contain Ni, Co, and Li as well as contain at least one of Mn and Al. In the composite oxide particles, the proportion of Ni is 50 mol % or more based on the total number of moles of the metal elements expect for Li (hereinafter, the composite oxide particles are referred to as "high Ni-content composite oxide particles"). With the proportion of Ni of 50 mol % or more, a larger capacity of the battery can be obtained. The content of Ni in the high Ni-content composite oxide particles is preferably 80 mol % to 95 mol %, in view of, for example, being able to obtain a larger capacity of the non-aqueous secondary battery.

The positive electrode mixture layer may include other positive electrode active materials than the high Ni-content composite oxide particles as long as objects of the present disclosure are not compromised. The positive electrode mixture layer may include, for example, non Ni-containing composite oxide particles such as $LiCoO_2$ and $LiMn_2O_4$, and composite oxide particles in which the proportion of Ni is less than 50 mol % based on the total number of moles of the metal elements expect for Li. The content of the high Ni-content composite oxide particles is preferably 30 mass % to 100 mass % and more preferably 80 mass % to 100 mass % based on the total mass of the positive electrode active material.

The high Ni-content composite oxide particles are preferably composite oxide particles represented by, for example, the general formula: $Li_xNi_{1-y-z}Co_yM_zO_2$, where $0.9 \leq x \leq 1.2$, $0 < y+z < 0.5$, and M is one or more metal elements including at least one of Al and Mn. Preferably, in the above general formula, $0.05 \leq y+z \leq 0.2$. The high Ni-content composite oxide particles may include other metal elements than Li, Ni, Co, Al, and Mn or the like. Examples of the other metal elements include Na, Mg, Sc, Zr, Ti, V, Ga, In, Ta, W, Sr, Y, Fe, Cu, Zn, Cr Pb, Sb, and B.

The high Ni-content composite oxide particles, which are particles having small surface projections and recesses, have a ratio of the BET specific surface area A ($m^2$/g) to the theoretical specific surface area B ($m^2$/g) (A/B), which can be determined by the following expression, of more than 1.0 and less than 4.3:

$$\text{Theoretical specific surface area } B \ (m^2/g) = 6/(\text{True density } (g/cm^3) \times \text{volume average particle size } (\mu m)).$$

When A/B is within the range, good cyclic characteristics can be achieved. It is also possible to prevent a rise in the resistance after storage at a high temperature. A/B is preferably more than 1.0 and less than 4.0, more preferably more than 1.0 and less than 3.0, and particularly preferably more than 1.0 and less than 2.0.

The BET specific surface area of the high Ni-content composite oxide particles is not particularly limited as long as A/B satisfies the above range, but is preferably 0.2 $m^2$/g to 5 $m^2$/g. In the case where the BET specific surface area of the high Ni-content composite oxide particles is less than 0.2 $m^2$/g, the loading characteristics may deteriorate and the energy density for a battery may decrease, in comparison with the case where the above range is satisfied. In the case where the BET specific surface area exceeds 5 $m^2$/g, the electrode plate density of the positive electrode may decrease and the energy density for a battery may decrease, in comparison with the case where the above range is satisfied.

The volume average particle size of the high Ni-content composite oxide particles is not particularly limited as long as A/B satisfies the above range, but is preferably 2 $\mu$m to 6 $\mu$m. In the case where the volume average particle size of the high Ni-content composite oxide particles is less than 2 $\mu$m or exceeds 6 $\mu$m for example, the packing density in the positive electrode active material layer may decrease and the capacity of the battery may decrease, in comparison with the case where the above range is satisfied.

The true density of the high Ni-content composite oxide particles is not particularly limited as long as A/B satisfies the above range, but is 4.3 g/cm³ to 4.7 g/cm³, for example.

The high Ni-content composite oxide particles may be either of particles in a non-aggregated state or particles in an aggregated state as long as A/B satisfies the above range. In other words, the positive electrode mixture layer includes at least either of high Ni-content composite oxide particles in a non-aggregated state or high Ni-content composite oxide particles in an aggregated state. Here, the non-aggregated state includes not only a state in which primary particles are completely separated one by one but also a state in which approximately several (e.g., 2 to 15) primary particles are assembled. The aggregated state is a state in which 16 or more primary particles are assembled.

The state of the high Ni-content composite oxide particles can be discriminated by means of an SEM image of a cross section of the particles obtained with a scanning electron microscope (SEM). For example, the positive electrode or the high Ni-content composite oxide particles are embedded into a resin, and a cross section of the positive electrode or the high Ni-content composite oxide particles is prepared by cross section polisher (CP) processing or the like. Then, an SEM image of this cross section is captured. In order to quantify the assembled state of the primary particles, first, particles having a particle diameter, which is identifiable by the SEM image of cross section, with an error within 10% from the volume average particle size are selected to identify, the particle size of the primary particles constituting the particles. The primary particles and the particles in an aggregated state are each assumed to be a true sphere, and the value is obtained from the ratio of the volume of the primary particles to the volume assumed from the volume average particle.

In the case where high Ni-content composite oxide particles in a non-aggregated state are used, distortion in the particles decreases in the charge/discharge cycles, and thus cracking of particles is prevented, in comparison with the case where the high Ni-content composite oxide particles in an aggregated state are used. For this reason, the effect of improving the cyclic characteristics is enhanced. Meanwhile, the high Ni-content composite oxide particles in an aggregated state can be synthesized more easily than the particles in a non-aggregated state, and thus, use of these can reduce the material cost.

The content of the positive electrode active material is preferably 70 mass % to 98 mass % and more preferably 80 mass % to 98 mass % based on the total mass of the positive electrode mixture layer. The positive electrode mixture layer includes, as mentioned above, besides the positive electrode active material, a conductive agent, and PVA functioning as a binder. The positive electrode mixture layer preferably also includes another binder component such as a fluorine resin, in addition to PVA. The content of the conductive agent, PVA, and binder such as a fluorine resin is preferably 2 mass % to 30 mass % and more preferably 2 mass % to 20 mass % based on the total mass of the positive electrode mixture layer.

The high Ni-content composite oxide particles are produced via a composite hydroxide synthesis step of obtaining, for example, a composite hydroxide containing Ni, Co, and Al, a composite hydroxide containing Ni, Co, and Mn, or the like, a raw material mixing step of mixing the composite hydroxide with a lithium compound to obtain a raw material mixture, and a firing step of firing the raw material mixture to obtain high Ni-content composite oxide particles.

The composite hydroxide synthesis step is, for example, a step of precipitating (coprecipitating) a composite hydroxide by adding an alkali solution such as sodium hydroxide dropwise while stirring a solution of a metal salt containing Ni and Co and containing Al or Mn to adjust the pH to the alkali side (e.g., 8.5 to 11.5). In the present step, aging may be conducted, in which the composite hydroxide is retained as it is in the reaction solution after the composite hydroxide is precipitated.

The raw material mixing step is a step of obtaining a raw material mixture by mixing, for example, the above composite hydroxide and a lithium compound such as lithium hydroxide, lithium carbonate, or lithium nitrate. A/B of the high Ni-content composite oxide particles to be finally obtained can be controlled within a range of more than 1.0 and less than 4.3 by adjusting the mixing proportion between the composite hydroxide and the lithium compound. One example of the mixing ratio between the composite hydroxide and the lithium compound, as the molar ratio of the metal elements (Ni+Co+Al or Mn):Li is 1.0:1.02 to 1.0:1.2.

The firing step is a step of obtaining high Ni-content composite oxide particles by firing the above raw material mixture under an oxygen atmosphere. A/B of the high Ni-content composite oxide particles can be controlled within a range of more than 1.0 and less than 4.3 also by adjusting the firing temperature for the raw material mixture.

One example of the firing temperature for the raw material mixture is 750° C. to 1100° C.

To the positive electrode mixture layer, a conductive agent is added in order to improve the electron conductivity of the mixture layer. The conductive agent adheres to the surface of the particles of the positive electrode active material or adheres to the surface of the positive electrode current collector to thereby form a conductive path in the positive electrode mixture layer. The volume average particle size of the conductive agent is smaller than the volume average particle size of the positive electrode active material and is 0.01 µm to 1 µm, for example. The BET specific surface area of the conductive agent is 30 m²/g to 1500 m²/g, for example.

Examples of the conductive agent include carbon materials such as carbon black, acetylene black, Ketjen black, and graphite. Examples of the shape of the conductive agent include particle shapes, shapes of connected particles, and fibrous shapes. One conductive agent may be used, or two or more of conductive agents may be used in combination. The content of the conductive agent in the positive electrode mixture layer is preferably 1 mass % to 20 mass %, more preferably 1 mass % to 15 mass %, and particularly preferably 1 mass % to 10 mass % based on the total mass of the positive electrode mixture layer.

PVA contained in the positive electrode mixture layer has a function of adhering to the surface of the particles of the positive electrode active material and the surface of the particles of the conductive agent to bind the particles of the positive electrode active material to one another, the particles of the conductive agent to one another, and the particles of the positive electrode active material to the particles of the conductive agent particles. PVA also binds the positive electrode active material and the conductive agent to the positive electrode current collector. PVA may function as a dispersant to enhance the dispersibility of the conductive agent in the positive electrode mixture slurry. It is difficult to cause high Ni-content composite oxide particles having small surface projections and recesses, such as A/B of more than 1.0 and less than 4.3, to strongly adhere to conductive agent particles by use of a binder commonly used in the positive electrode mixture layer, but use of PVA markedly enhances the adhesion among both the particles. For this reason, it is conceived that the electron conductivity of the positive electrode mixture layer is enhanced to thereby improve the initial discharge capacity of the battery.

PVA preferably has a degree of saponification of 85% or less. PVA can be obtained by generally substituting (saponifying) acetic acid groups of polyvinyl acetate, which is a polymer of vinyl acetate, by (into) hydroxyl groups, using an alkali. The degree of saponification (mol %), which is the ratio between the hydroxyl groups and the acetic acid groups, is represented by number of hydroxyl groups/(number of hydroxyl groups+number of acetic acid groups)×100. The degree of saponification of PVA is measured by the titration method described in JIS K 6726 (Testing methods for polyvinyl alcohol). The degree of saponification of PVA is more preferably 50% to 85% and particularly preferably 60% to 70%. When the degree of saponification is within the range, preparation of the positive electrode mixture slurry is facilitated, and good adhesion to the positive electrode active material and the conductive agent is easily obtained. Two or more types of PVA having a different degree of saponification may be added to the positive electrode mixture layer.

The degree of polymerization of PVA is 50 to 4000, for example. The degree of polymerization of PVA is measured by relative comparison of viscosity measurements with the viscosity of water described in HS K 6726 (Testing methods for polyvinyl alcohol) or the like. The degree of polymerization of PVA is preferably 100 to 1000 and more preferably 150 to 300. When the degree of polymerization is within the range, preparation of the positive electrode mixture slurry is facilitated, and good adhesion to the positive electrode active material and the conductive agent is easily obtained. Two or more types of PVA having a different degree of polymerization may be added to the positive electrode mixture layer. PVA may include other functional groups than the hydroxyl group and acetic acid group, for example, an acetoacetyl group, a sulfonic acid group, a carboxyl group, a carbonyl group or the like as long as objects of the present disclosure are not compromised.

The content of PVA in the positive electrode mixture layer is 1 part by mass to 20 parts by mass, preferably 2 parts by mass to 15 parts by mass, more preferably 2 parts by mass to 10 parts by mass, and particularly preferably 2.5 parts by mass to 5 parts by mass, for example, per 100 parts by mass of the conductive agent. When the content of PVA is within the range, a high initial discharge capacity is easily obtained. The content of PVA is 0.01 mass % to 1 mass % based on the total mass of the positive electrode mixture layer, for example.

The positive electrode mixture layer preferably includes another binder in addition to PVA. Examples of the binder to be used in combination with PVA include fluorine resins such as polytetrafluoroethylene (PTFE), polyvinylidene fluoride (PVdF), and polyvinylidene fluoride (PVdF)-hexafluoropropylene (HFP) copolymers, polyacrylonitrile (PAN), polyimide resins, acryl resins, and polyolefin resins. Among these, fluorine resins such as PTFE and PVdF are preferred, and PVdF is particularly preferred. The content of another binder such as a fluorine resin in the positive electrode mixture layer may be larger than the content of PVA and, for example, is 0.5 mass % to 5 mass % based on the total mass of the positive electrode mixture layer.

The positive electrode mixture layer may contain other polymer materials and surfactants in order to improve the ease of coating and stability over time of the positive electrode mixture slurry. Examples of the other polymer materials include materials soluble in N-methyl-2-pyrrolidone such as polyvinylpyrrolidone (PVP), polyvinyl butyral, and cellulose-based polymers. Examples of the surfactant include nonionic surfactants such as polyoxyethylene alkyl ether.

[Negative Electrode]

The negative electrode 12 has a negative electrode current collector and a negative electrode mixture layer provided on the current collector. Foil of a metal that is stable in the electric potential range of the negative electrode, such as copper, a film with such a metal disposed as an outer layer, and the like can be used for the negative electrode current collector. The negative electrode mixture layer preferably includes a negative electrode active material and a binder and is provided on both the surfaces of the negative electrode current collector. The negative electrode 12 can be produced by coating a negative electrode mixture slurry including a negative electrode active material, a binder, and the like on a negative electrode current collector, drying the coating, and rolling the dried coating to form a negative electrode mixture layer on both the surfaces of the negative electrode current collector.

The negative electrode active material is not particularly limited as long as being capable of reversibly intercalating and releasing lithium ions. A carbon material such as graphite is generally used. Graphite may be either of natural graphite such as flaky graphite, massive graphite, or earthy graphite or artificial graphite such as massive artificial graphite (MAG), or graphitized mesophase carbon microbeads (MCMB). The surface of the carbon material may be coated with a heterogeneous or homogeneous carbon layer. Alternatively, as the negative electrode active material, a metal to be alloyed with Li such as Si and Sn, a metal compound including Si, Sn, or the like (e.g., a silicon compound represented by $SiO_x$, where $0.5 \leq x \leq 1.6$, a silicon compound represented by $Li_{2y}SiO_{(2+y)}$, where $0 < y < 2$, or the like), a lithium-titanium composite oxide, or the like may be used.

As the binder included in the negative electrode mixture layer, a fluorine-containing resin such as PTFE and PVdF, PAN, polyimide, an acryl resin, polyolefin, styrene-butadiene rubber (SBR), or the like can be used. The negative electrode mixture layer may also include CMC or a salt thereof, polyacrylic acid (PAA) or a salt thereof, PVA, or the like. The negative electrode mixture layer includes, for example, SBR and CMC or a salt thereof.

[Separator]

An ion-permeable and insulating porous sheet is used as the separator 13. Specific examples of the porous sheet include a microporous thin film, woven fabric, and nonwoven fabric. Suitable examples of the material for the separator include polyolefins such as polyethylene and polypropylene, and cellulose. The separator 13 may have a single-layer structure or may have a layered structure. On the surface of the separator 13, a layer of a resin having high heat resistance such as an aramid resin or a filler layer including an inorganic compound filler may be provided.

[Non-Aqueous Electrolyte]

The non-aqueous electrolyte includes a non-aqueous solvent and an electrolyte salt dissolved in the non-aqueous solvent. As the non-aqueous solvent, esters, ethers, nitriles such as acetonitrile, amides such as dimethylformamide, and mixed solvents of two or more thereof can be used. The non-aqueous solvent may contain a halogen-substituted product formed by replacing at least one hydrogen atom of any of the above solvents with a halogen atom such as fluorine. Examples of the halogen-substituted product include fluorinated cyclic carbonate esters such as fluoroethylene carbonate (FEC), fluorinated chain carbonate esters, and fluorinated chain carboxylate esters such as methyl fluoropropionate (FMP).

Examples of the esters include cyclic carbonate esters, such as ethylene carbonate (EC), propylene carbonate (PC), and butylene carbonate; chain carbonate esters, such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylate esters such as γ-butyrolactone (GBL) and γ-valerolactone (GVL); and chain carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as, 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (where $1 < x < 6$, n is 1 or 2), $LiB_{10}Cl_{10}$, LiCl, LiBr, LiI, chloroborane lithium, lithium lower aliphatic carboxylate, borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ (where l and m are each an integer of 0 or more). These lithium salts may be used singly or two or more thereof may be mixed and used. Among these, $LiPF_6$ is preferably used in view of ionic conductivity, electrochemical stability, and other properties. The concentration of the lithium salt is, for example, 0.8 mol to 1.8 mol per 1 L of a non-aqueous solvent.

EXAMPLES

Hereinafter, the present disclosure will be further described with reference to examples, but the present disclosure is not intended to be limited to the following examples.

Example 1 to Example 4

[Synthesis of High Ni-Content Composite Oxide Particles]

$[Ni_{0.5}Co_{0.2}Mn_{0.3}](OH)_2$ obtained by a coprecipitation method and $Li_2CO_3$ were mixed in an Ishikawa-type grinding mortar such that the molar ratio between the total amount of Ni, Co, and Mn and Li was 1.0:1.1. This mixture was fired in an air atmosphere at 1000° C. for 40 hours and then ground to obtain high Ni-content composite oxide particles. The high Ni-content composite oxide particles obtained had a BET specific surface area A of 0.43 $m^2/g$, a volume average particle size of 5.4 μm, and a true density of 4.67 $g/cm^3$. The theoretical specific surface area B of the high Ni-content composite oxide particles was 0.24, and the ratio of the BET specific surface area A to the theoretical specific surface area B (A/B) was 1.81.

[Production of Positive Electrode]

The high Ni-content composite oxide particles described above were used as the positive electrode active material. Acetylene black (AB), PVA, PVP, and polyoxyethylene alkyl ether were mixed in a mass proportion shown in Table 1 into N-methyl-2-pyrrolidone (NMP) and then dispersed to prepare a conductive agent slurry. The degree of saponification and the degree of polymerization of the PVA used are shown in Table 2. The conductive agent slurry, the positive electrode active material, and polyvinylidene fluoride (PVdF) were mixed, and an appropriate amount of N-methyl-2-pyrrolidone was added thereto to prepare a positive electrode mixture slurry. At this time, the materials were mixed such that the mass ratio among the positive electrode active material, acetylene black, and PVdF was 100:1:1. Then, the positive electrode mixture slurry was coated onto both the surfaces of a positive electrode current collector composed of aluminum foil, the coating was dried, and the coating was rolled using a rolling roller. Thereafter, the current collector was cut to a predetermined electrode size to obtain a positive electrode (working electrode) in which a mixture layer was formed on both the surfaces of the current collector. A positive electrode lead made of aluminum was attached to a portion of the positive electrode current collector at which no mixture layer is formed.

[Production of Test Battery]

The positive electrode produced was used as the working electrode. After an electrode group in which a separator was interposed between a counter electrode and a reference electrode was housed in an exterior body, an electrolyte solution was injected to the exterior body, and the exterior body was sealed to produce a test battery. The designed capacity of the test battery was 100 mAh.

The counter electrode, the reference electrode, the separator, and the electrolyte solution are as follows.

Counter electrode: lithium metal

Reference electrode: lithium metal

Separator: separator made of polyethylene

Electrolyte solution: To a non-aqueous solvent obtained by mixing ethylene carbonate (EC) and ethyl methyl carbonate (EMC) such that the volume ratio reached 30:70, $LiPF_6$ was dissolved at a concentration of 1.0 mol/L.

Comparative Example 1

A positive electrode and a battery were produced in the same manner as in Example 1, except that the component blending ratio for the conductive agent slurry was as described in Table 1 in the production of the positive electrode. As described in Table 1, no PVA was added in Comparative Example 1.

Comparative Example 2

[Synthesis of High Ni-Content Composite Oxide Particles]

$[Ni_{0.5}Co_{0.2}Mn_{0.3}](OH)_2$ obtained by a coprecipitation method and $Li_2CO_3$ were mixed in an Ishikawa-type grinding mortar such that the molar ratio between the total amount of Ni, Co, and Mn and Li was 1.0:1.1. Thereafter, this mixture was fired in an air atmosphere at 950° C. for 10 hours and then ground to obtain high Ni-content composite oxide particles. The high Ni-content composite oxide particles obtained had a BET specific surface area A of 0.41 $m^2/g$, a volume average particle size of 13.7 μm, and a true density of 4.65 $g/cm^3$. The theoretical specific surface area B of the high Ni-content composite oxide particles was 0.09, and the ratio of the BET specific surface area. A to the theoretical specific surface area B (A/B) was 4.35.

[Production of Positive Electrode and Production of Test Battery]

A positive electrode and a battery were produced in the same manner as in Example 1, except that the high Ni-content composite oxide particles described above were used as the positive electrode active material and the component blending ratio for the conductive agent slurry was as described in Table 1 in the production of the positive electrode.

Comparative Example 3

A positive electrode and a battery were produced in the same manner as in Comparative Example 2, except that the component blending ratio for the conductive agent slurry was as described in Table 1 in the production of the positive electrode. As described in Table 1, no PVA was added in Comparative Example 3.

Comparative Example 4

A positive electrode was produced in the same manner as in Example 1, except that the component blending ratio for the conductive agent slurry was as described in Table 1 and PVA having the degree of saponification and the degree of polymerization shown in Table 2 was used in the production of the positive electrode.

[Evaluation of Initial Discharge Capacity]

The test batteries of Examples and Comparative Examples were charged under an environment of a temperature of 25° C. at a constant current of 10 mA until the battery voltage reached 4.3 V relative to the reference electrode. Then, constant voltage charging was carried out at 4.3 V with the termination current set to 2 mA. Thereafter, a rest of 10 minutes was taken, discharging was carried out at a constant current of 10 mA until the battery voltage reached 2.5 V relative to the reference electrode, and the initial discharge capacity was determined. The initial discharge capacities of the batteries of Examples 1 to 4 and Comparative Example 1 are represented as relative values with the initial discharge capacity of the battery of Comparative Example 1 assumed to be 100%, and the initial discharge capacities of the batteries of Comparative Examples 2 and 3 are represented as relative values with the initial discharge capacity of the battery of Comparative Example 3 assumed to be 100%. The evaluation results are shown in Table 2.

TABLE 1

|  | AB (parts by mass) | PVA (parts by mass) | PVP (parts by mass) | Polyoxyethylene alkyl ether (parts by mass) |
|---|---|---|---|---|
| Example 1 | 100 | 2.0 | 6.7 | 1.3 |
| Example 2 | 100 | 3.3 | 6.7 | 1.3 |
| Example 3 | 100 | 3.3 | 6.7 | 1.3 |
| Example 4 | 100 | 15.0 | 0 | 0 |
| Comparative Example 1 | 100 | 0 | 10 | 1.3 |
| Comparative Example 2 | 100 | 3.3 | 6.7 | 1.3 |
| Comparative Example 3 | 100 | 0 | 6.7 | 1.3 |
| Comparative Example 4 | 100 | 3.3 | 6.7 | 1.3 |

TABLE 2

| | High Ni-content composite oxide particles | | | | | | Amount of PVA | |
| | Average | BET | Theoretical | | | PVA | added per 100 parts | Battery initial |
| | particle size (μm) | specific surface area A (m²/g) | specific surface area B (m²/g) | A/B | Degree of saponification (%) | Degree of polymerization | by mass of carbon black (parts by mass) | discharge capacity vs. reference ratio (%) |
|---|---|---|---|---|---|---|---|---|
| Example 1 | 5.4 | 0.43 | 0.24 | 1.81 | 65 | 250 | 2.0 | 171 |
| Example 2 | | | | | 65 | 250 | 3.3 | 181 |
| Example 3 | | | | | 85 | 500 | 3.3 | 178 |
| Example 4 | | | | | 65 | 250 | 15.0 | 153 |
| Comparative Example 1 | | | | | — | — | 0 | 100 (reference) |
| Comparative Example 2 | 13.7 | 0.41 | 0.09 | 4.35 | 65 | 250 | 3.3 | 98 |
| Comparative Example 3 | | | | | — | — | 0 | 100 (reference) |
| Comparative Example 4 | 5.4 | 0.43 | 0.24 | 1.81 | 95 | 250 | 3.3 | No battery evaluation available because of inhomogeneous paste |

As shown in Table 2, all the test batteries of Examples comprising the positive electrode mixture layer including PVA having a degree of saponification of 85% or less have a higher initial discharge capacity than that of test batteries of Comparative Examples. As shown in Table 3 shown below, in the case where composite oxide particles having a ratio of the BET specific surface area A to the theoretical specific surface area B (A/B) of more than 1.0 and less than 4.3 are used as the positive electrode active material, the cyclic characteristics of the batteries are improved. According to the test batteries of Examples, in the case where a positive electrode active material that achieves good cyclic characteristics is used, it is possible to markedly enhance the initial discharge capacity.

Reference Example 1

[Production of Positive Electrode]

After the high Ni-content composite oxide particles shown in Examples 1 as the positive electrode active material, acetylene black as the conductive agent, and polyvinylidene fluoride as the binder were mixed such that the mass ratio thereof was 94:4:2, N-methyl-2-pyrrolidone was added thereto to prepare a positive electrode mixture slurry. Subsequently, this positive electrode mixture slurry was coated onto both the surfaces of a positive electrode current collector composed of aluminum foil, the coated slurry was dried, and the collector was rolled using a rolling roller to produce a positive electrode in which a positive electrode active material layer was formed on both the surfaces of the positive electrode current collector.

[Production of Negative Electrode]

Graphite as the negative electrode active material, a styrene-butadiene copolymer (SBR) as the binder, and carboxymethyl cellulose (CMC) as the thickener were mixed such that the mass ratio thereof was 100:1:1, and water was added thereto to prepare a negative electrode mixture slurry. Subsequently, the negative electrode mixture slurry was coated onto both the surfaces of a negative electrode current collector composed of copper foil, the coated slurry was dried, and the collector was rolled using a rolling roller to produce a negative electrode in which a negative electrode active material layer was formed on both the surfaces of the negative electrode current collector.

[Preparation of Non-Aqueous Electrolyte]

To a mixed solvent prepared by mixing ethylene carbonate (EC), propylene carbonate (PC), dimethyl carbonate (DMC), and ethyl methyl carbonate (EMC) at a volume ratio of 20:5:35:40, LiPF$_6$ was dissolved at a concentration of 1.4 mol/L to prepare a non-aqueous electrolyte.

[Production of Non-Aqueous Electrolyte Secondary Battery]

The positive electrode and the negative electrode described above were wound together with a separator therebetween to produce an electrode assembly. The electrode assembly, together with the non-aqueous electrolyte described above, was housed in a bottomed cylindrical battery case, and the opening of the battery case was sealed with a gasket and a sealing assembly.

Reference Example 2

A positive electrode and a non-aqueous electrolyte secondary battery were produced in the same manner as in Reference Example 1, except that the high Ni-content composite oxide particles shown in Comparative Example 2 were used as the positive electrode active material.

[Evaluation of Cyclic Characteristics (Capacity Retention)]

At an environment temperature of 25° C., each non-aqueous electrolyte secondary battery of Reference Examples 1 and 2 was subjected to charging at a constant current of 0.5 It until the voltage reached 4.3 V, then subjected to constant-voltage charging until 0.05 It was achieved, and subjected to constant-current discharging at a constant current of 0.5 It until the voltage reached 3.0 V. This cycle consisting of the charge and the discharge described above was carried out 300 time.

The capacity retention in the charge/discharge cycles of the non-aqueous electrolyte secondary battery of each Reference Example was determined by the following expression. A higher capacity retention indicates that the deterioration in the charge/discharge cyclic characteristics was more highly prevented. The evaluation results are shown in Table 3.

Capacity retention=(Discharge capacity at 300th cycle/Discharge capacity at first cycle)×100

TABLE 3

| | High Ni-content composite oxide particles | | | | |
|---|---|---|---|---|---|
| | Average particle size (μm) | BET specific surface area A (m²/g) | Theoretical specific surface area B (m²/g) | A/B | 25° C. cycle capacity retention |
| Reference Example 1 | 5.4 | 0.43 | 0.24 | 1.81 | 91.4 |
| Reference Example 2 | 13.7 | 0.41 | 0.09 | 4.35 | 82.8 |

REFERENCE SIGNS LIST

10 non-aqueous electrolyte secondary battery
11 positive electrode
12 negative electrode
13 separator
14 electrode assembly
15 battery case
16 exterior can
17 sealing assembly
18, 19 insulating plate
20 positive electrode lead
21 negative electrode lead
22 projecting portion
23 filter
24 lower vent member
25 insulating member
26 upper vent member
27 cap
28 gasket

The invention claimed is:

1. A positive electrode for a non-aqueous electrolyte secondary battery, including a current collector and a mixture layer provided on the current collector, wherein the mixture layer includes composite oxide particles containing Ni, Co, and Li and containing at least one of Mn and Al, a conductive agent, and polyvinyl alcohol having a degree of saponification of 65% or more and 85% or less, a content of the polyvinyl alcohol in the mixture layer is 2.5 parts by mass to 3.3 parts by mass per 100 parts by mass of the conductive agent, the composite oxide particles have a proportion of Ni of 80 mol % or more based on the total number of moles of the metal elements expect for Li, a degree of polymerization of the polyvinyl alcohol is 50 to 300, and a ratio of a BET specific surface area A (m²/g) to a theoretical specific surface area B (m²/g) (A/B) to be determined by the following expression is more than 1.8 and less than 4.3:

Theoretical specific surface area $B$ (m²/g)=6/(True density (g/cm³)×volume average particle size (μm)).

2. The positive electrode for a non-aqueous electrolyte secondary battery according to claim 1, wherein the degree of polymerization of the polyvinyl alcohol is 100 to 250.

3. The positive electrode for a non-aqueous electrolyte secondary battery according to claim 1, wherein the mixture layer further includes a fluorine resin.

4. The positive electrode for a non-aqueous electrolyte secondary battery according to claim 1, wherein a volume average particle size of the composite oxide particles is 2 μm to 6 μm.

5. The positive electrode for a non-aqueous electrolyte secondary battery according to claim 1, wherein the BET specific surface area A is 0.2 m²/g to 5 m²/g.

6. A non-aqueous electrolyte secondary battery, comprising:

the positive electrode for a non-aqueous electrolyte secondary battery according to claim 1;

a negative electrode; and a non-aqueous electrolyte.

7. The positive electrode for a non-aqueous electrolyte secondary battery according to claim 1, wherein the degree of saponification of the polyvinyl alcohol is 65% or more and 70% or less.

* * * * *